United States Patent
Jouppi et al.

(10) Patent No.: US 6,785,402 B2
(45) Date of Patent: Aug. 31, 2004

(54) HEAD TRACKING AND COLOR VIDEO ACQUISITION VIA NEAR INFRARED LUMINANCE KEYING

(75) Inventors: Norman Jouppi, Palo Alto, CA (US); Subramonium Iyer, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 616 days.

(21) Appl. No.: 09/784,902

(22) Filed: Feb. 15, 2001

(65) Prior Publication Data

US 2002/0118861 A1 Aug. 29, 2002

(51) Int. Cl.$^7$ .......................... G06K 9/00; G03B 21/26; H04N 9/74
(52) U.S. Cl. ...................... 382/103; 353/30; 348/584; 348/590
(58) Field of Search ................... 353/30; 348/584–599; 382/103

(56) References Cited

U.S. PATENT DOCUMENTS

| | | | | |
|---|---|---|---|---|
| 5,243,130 A | * | 9/1993 | Kitagawa ........................ | 174/50 |
| 5,500,671 A | * | 3/1996 | Andersson et al. ............ | 348/14.1 |
| 5,923,380 A | * | 7/1999 | Yang et al. .................... | 348/586 |
| 5,940,139 A | * | 8/1999 | Smoot ............................ | 348/584 |
| 5,973,751 A | * | 10/1999 | Ishida et al. .................. | 348/590 |
| 6,031,934 A | * | 2/2000 | Ahmad et al. ................. | 382/154 |
| 6,327,004 B1 | * | 12/2001 | Miyabayashi et al. ........ | 348/590 |
| 6,454,415 B1 | * | 9/2002 | Vlahos .......................... | 353/30 |
| 6,531,693 B1 | * | 3/2003 | Focke et al. .................. | 250/221 |
| 2002/0186314 A1 | * | 12/2002 | Debevec ........................ | 348/371 |

FOREIGN PATENT DOCUMENTS

WO   WO 03/081911 A1 * 10/2003 ............ H04N/5/32

OTHER PUBLICATIONS

Morimoto et al, "Real–Time Multiple Face Detection using Active Illumination", IEEE, 2000, pp. 8–13.
Wilder et al., "Comparison of Visible and Infra–Red Imagery for Face Recognition", IEEE, 1996, pp. 182–187.

* cited by examiner

Primary Examiner—Leo Boudreau
Assistant Examiner—Hussein Akhavannik

(57) ABSTRACT

A system and corresponding method for head tracking and color video acquisition via near infrared luminance keying is disclosed. The head of the local user is tracked in real time by uniformly illuminating a rear projection screen that surrounds a display cube with light having a wavelength in the near-infrared spectrum. A near-infrared image of the head of the local user is acquired by a near-infrared camera equipped with filters that discern the difference between the illuminated rear projection screen and any foreground illumination. A color image of the head of a local user and the projection of a remote location are acquired by a color camera, placed in close proximity to the near-infrared camera. A bounding box is then placed around the head of the local user in the near-infrared image. This bounding box is then translated to the view space of the color camera. This translated image is then used to crop the color image. The cropped color image is then transmitted to the remote location.

18 Claims, 5 Drawing Sheets

HEAD TRACKING AND COLOR VIDEO ACQUISITION VIA NEAR INFRARED LUMINANCE KEYING

FIELD OF THE INVENTION

The present invention generally relates to object acquisition and tracking techniques and, more particularly, to real-time head tracking techniques performed in a mutually-immersive environment.

BACKGROUND OF THE INVENTION

Telepresence systems allow a local user to view a remote location (i.e. a conference room) as if they were present at the remote location. Mutually-Immersive telepresence system environments allow the local user to interact with individuals present at the remote location. In a mutually-immersive environment, the local user sits inside a display area, with a projection surface surrounding the local user outside of the display area; thereby, surrounding (or immersing) the local user. Cameras are positioned about the display area to collect images of the local user. In application, live color images of the local user are acquired by the cameras and subsequently transmitted to the remote location, concurrent with projection of live video from the remote location on the projection surfaces surrounding the local user. The local user is able to move about inside the display area; thus algorithms are needed to track the head position of the local user.

Conventional head tracking methods include generating a representation of a user's head based on the detection of the user's eyes or other facial features. An example of such a method would be to use the retro-reflectivity property of the human eye, when illuminated by light, to detect and track head position. A drawback associated with such an approach is that the head of the person being tracked must always be facing a camera. If the user turns away from the camera, eye reflectivity can no longer be detected. Thus, head position tracking cannot be accurately maintained.

Another conventional head tracking method calls for the local user to wear tracking hardware, such as, used for motion capture in computer graphics, and to transform the position information obtained from the tracking hardware into a bounding box image based on the lens focal length of the tracking hardware and the particular system geometry. A drawback associated with this approach is that the local user would have to be burdened with wearing the oftentimes cumbersome tracking hardware. Also, the tracking hardware degrades final image quality, as the tracking hardware would be visible in any resulting image.

A drawback of specific relevance to mutually-immersive environments, as described above, is that the projected views that surround the local user often contain images of other people from the remote location. Consequently, differentiating the local user's head from those projected from the remote location becomes difficult. A known approach used to distinguish the head of the local user from the projected heads is to subtract the projected video images from still images acquired from the local cameras; this is commonly referred to as difference keying. The synchronization between the projected video images and the acquired still images can be tricky, however, due to delays caused by various system components. In addition, difference keying is computationally expensive since the video images are large (on average 720×480) and must be warped and manipulated (e.g. subtracted) in real time.

SUMMARY OF THE INVENTION

The aforementioned and related drawbacks associated with conventional head tracking methods are substantially reduced or eliminated by the head tracking technique of the present invention. The present invention is directed to using luminance keying as a head tracking technique for use in conjunction with a mutually immersive telepresence environment. The head of the local user is tracked in real time by uniformly illuminating a rear projection screen that surrounds a display cube with light having a wavelength in the near-infrared spectrum. A near-infrared image of the head of the local user is acquired by a near-infrared camera equipped with visible-cut near-infrared pass filters that discern the difference between the illuminated rear projection screen, representing the background, and any foreground illumination. A color image of the head of the local user, and any color images on the rear projection are acquired by a color camera. A bounding box is then provided around the head of the local user in the near-infrared image. This bounding box image is then translated to the view space of the color camera. The translated image is then used to crop the color image, which is then transmitted to a remote location.

In application, the local user is placed within a display cube. Each side of the display cube is covered with a projection screen. Thus, the projection screen is always positioned substantially behind the local user. A plurality of near-infrared illuminators are positioned behind the projection screen. The near-infrared illuminators provide near-infrared light uniformly against the projection screen. A projector, which is adapted not to emit light in the near-infrared spectrum, is positioned about the near-infrared illuminators behind the projection screen. The projector provides a video image of the remote location on the projection screen. A camera unit, including a stacked color camera and a near-infrared camera, is positioned at the corners of the display cube. In an alternate embodiment, the camera unit is located in front of the local user. The near-infrared camera detects any luminance differences between an object located within the display cube relative to the luminance value of the projection screen. According to the present invention, such object is considered to be the head of the local user. This is referred to as luminance keying.

The color camera detects the color image of the remote location projected onto the projection screen by the projector and the local user located in front of the screen. The images detected by the near-infrared and color cameras are then transferred to a processor. The processor performs a bounding box process on the pixels that represent the local user's head in the near-infrared image. The processor then translates the bounding box to the view space of the color camera, then crops the color images based on the translated bounding box. This cropped, color version of the local user's head in front of the projected image is then transmitted to the remote location.

An advantage of the present invention is that it provides the ability to distinguish a locally present object from projected images of objects at remote locations.

Another advantage of the present invention is that distinguishing between local objects and remote objects is performed in real time.

A feature of the present invention is that it is economical and straightforward to implement.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which.

DETAILED DESCRIPTION OF THE INVENTION

Figure 1:
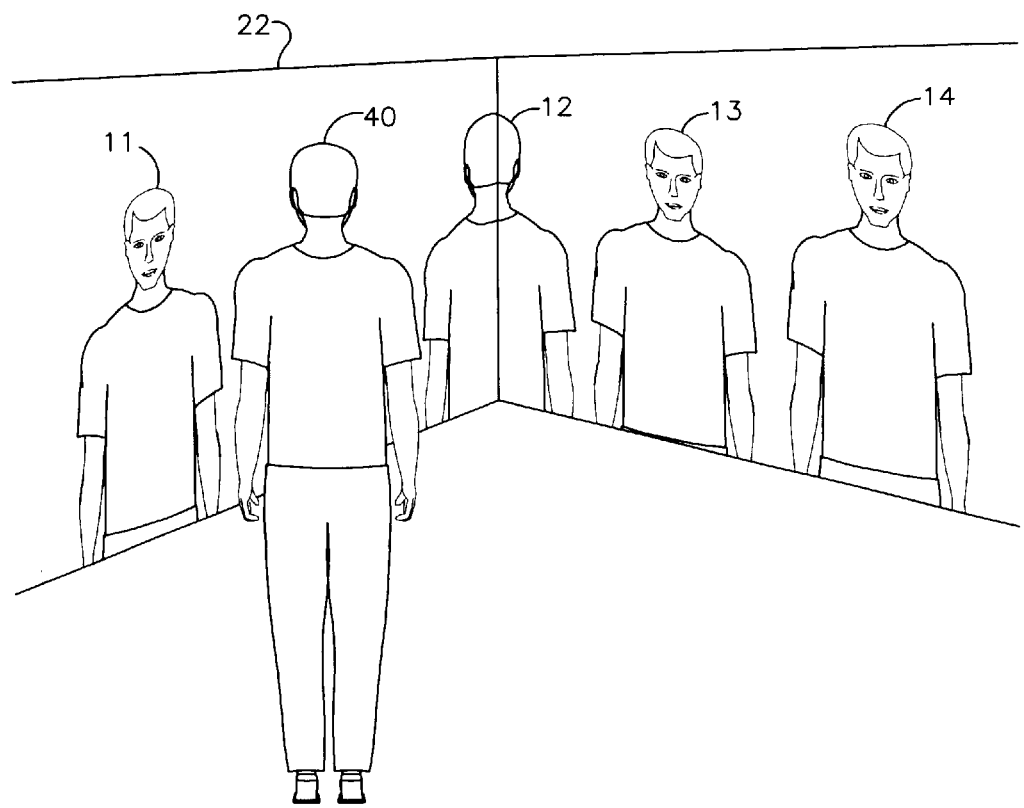
FIG. 1 is a graphic representation of a projected view provided by a conventional immersive telepresence system and a local user.

The luminance keying head tracking technique of the present invention will now be described with reference to FIGS. 1–7. As generally discussed above, in mutually-immersive telepresence environments, the local user is placed within a display area, with a projection of the remote location being provided on the projection surface that surrounds the local user. Concurrent with the display of the remote location within the display area, an image of the local user is transmitted to the remote location. This concurrent transfer of images provides the effect of the local user being physically present at the remote location. A drawback associated with such telepresence environments is that the color camera of the system cannot easily differentiate between the local user and images of other people from the remote location projected onto the projection surface, as illustrated in FIG. 1. FIG. 1 is a graphic representation of a projected view acquired by the color camera of a conventional telepresence system, with the local user 40 being surrounded by a plurality of projected images 11–14. As shown in FIG. 1, the face of the local user and one of the remote users 12 are facing away from the corresponding cameras. The present invention overcomes such image differentiating problems by providing a robust, real-time head detection and tracking technique for use in mutually-immersive telepresence environments.

Figure 2:
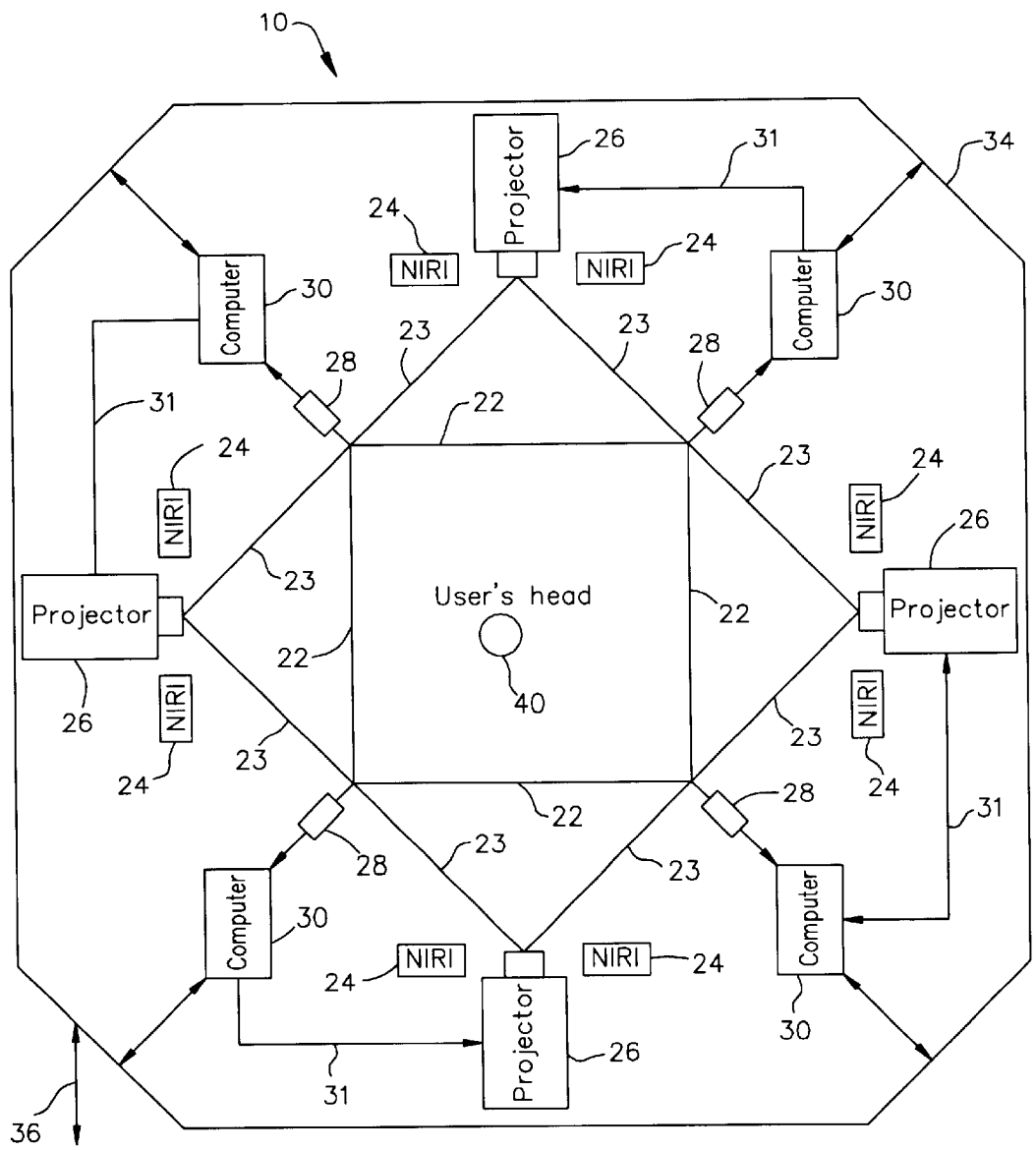
FIG. 2 is a schematic top view of the display cube used in the mutually-immersive telepresence system of the present invention.

FIG. 2 is a schematic top view of the display cube used to provide the mutually-immersive environment and adapted to track the position of the head 40 of the local user according to the present invention. The display cube 10 comprises a display room having a rear projection screen 22 provided on each side of the display room; thereby, surrounding the local user. A plurality of near-infrared illuminators 24 is positioned behind rear projection screen 22 along each side of the display cube 10. The near-infrared illuminators 24 are operative to uniformly illuminate the rear projection screen 22 with light having a wavelength in the near-infrared (700 Å-1000 Å) spectrum. In an exemplary embodiment of the present invention, the near-infrared illuminators 24 are implemented using incandescent light bulbs, covered with visible-cut near-infrared pass filters. Other illumination mechanisms, such as a bank of light emitting diodes (LEDs) having a peak output wavelength of about 880 nm and a bandwidth of about 80 nm can also be used.

A rear projector 26 is also positioned behind the rear projection screen 22 along each side of the display cube 10. Each rear projector 26 is generally positioned between the near-infrared illuminators 24 and is used to project a video image of the remote location on the rear projection screen 22. The output beam lines from each rear projector 26 are shown as lines 23. As the user is positioned in the central portion of the display cube 10, the video image provided by the rear projector 26 (encompassed within the beam lines 23) surrounds the local user. In this fashion, the local user is provided with a sensation of actually being at, or within, the remote location. Each rear projector 26 includes a series of color (red, green, blue) filters (not shown) that filter out substantially all of the near-infrared light energy generated by the lamp within the projector. As such, only negligible amounts of near-infrared light are provided by each rear projector 26. Thus, the only significant sources of near-infrared light within the display cube 10 are the near-infrared illuminators 24. This becomes important when detecting head position as discussed in greater detail below.

Figure 3:
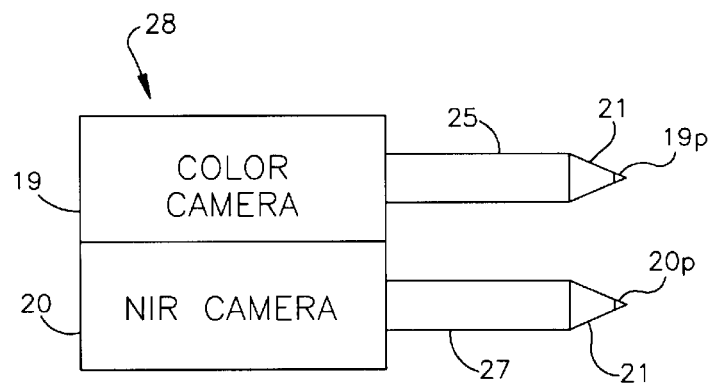
FIG. 3 is a schematic view of the camera unit used in the display cube illustrated in FIG. 2.

Positioned at each corner of the display cube 10 is a camera unit 28. The camera units 28 are used to acquire different positional views of the user's head. Each camera unit 28 is connected (line 31) to a corresponding processing device, such as computer 30, used to process the signals provided by the camera units 28. The computers 30 are interconnected via line 34 to form a network. Each of the camera units 28 includes a color camera 19 and a monochrome near-infrared camera 20 (FIG. 3). As illustrated in greater detail in FIG. 3., the color camera 19 includes a pin hole lens 21, provided on an extension 25. The pin hole lens has an opening 19p. Likewise, the near-infrared camera 20 includes a pin hole lens, provided on an extension 27. The pin hole lens of the near-infrared camera 20 has an opening 20p. In an exemplary embodiment, the color camera 19 is a conventional charge-coupled device (CCD) camera equipped first with an R-pass only filter; next with a B-pass only filter; then with a G-pass only filter that are interleaved in two dimensions over the CCD pixel array. The near-infrared camera 20 is a monochrome CCD camera equipped with a visible-cut near-infrared pass filter which only allows passage of light having a wavelength in the near-infrared spectrum.

As shown in FIG. 3, in an exemplary embodiment, the color camera 19 is stacked on top (i.e., in a vertical orientation) of the near-infrared camera 20 in order to reduce the paralax error between the two cameras. In an alternate embodiment, the camera position can be switched. Also, in another alternate embodiment, the color camera 19 and the near-infrared camera 20 can be positioned side-by-side (i.e., in a horizontal orientation). Other arrangements using a common lens and a beam splitter may also be used. What is required is that the two cameras be placed in close proximity to one another in order to reduce the paralax error between the two cameras.

In operation, the near-infrared illuminators 24 uniformly illuminate the rear projection screen 22 with light having a wavelength in the near-infrared spectrum. The near-infrared light provides the background that is used by the near-infrared camera 20 in detecting the luminance difference between the head of the local user 40 and the rear projection screen 22. Any luminance difference detected by the near-infrared camera 20 is considered to be in the foreground.

Figure 4:
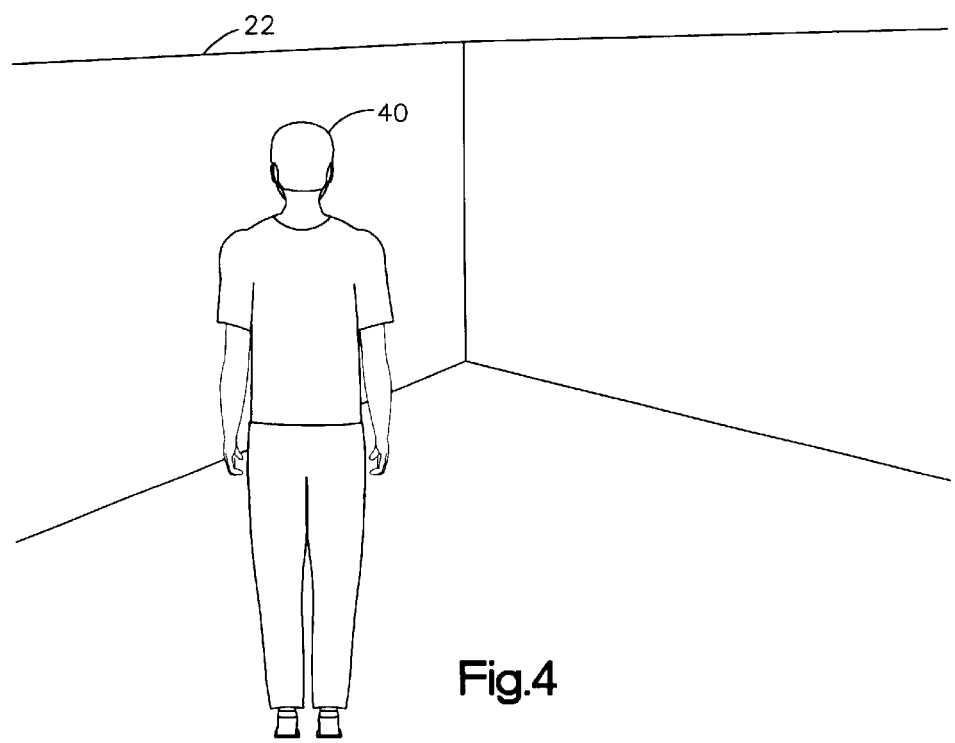
FIG. 4 is a schematic representation of a rear image of the user's head provided by the camera unit in accordance with the tracking method of the present invention.

This is referred to as luminance keying. As will be discussed in greater detail below, based on this foreground information, the user's head can be detected and accurately tracked. An important advantage provided by the luminance keying method of the present invention over conventional head tracking techniques, particularly retro-reflectivity techniques, is that the local user is not required to always be looking into a camera, or comparable mechanisms, to provide head position information. All that is necessary is a difference in luminance within the interior of the display cube 10, with respect to the rear projection screen 22. Thus, as illustrated in FIG. 4, the local user's head 40 can be accurately detected by the near-infrared camera 20 even when the local user is looking away from the camera unit.

Figures 5, 5A:
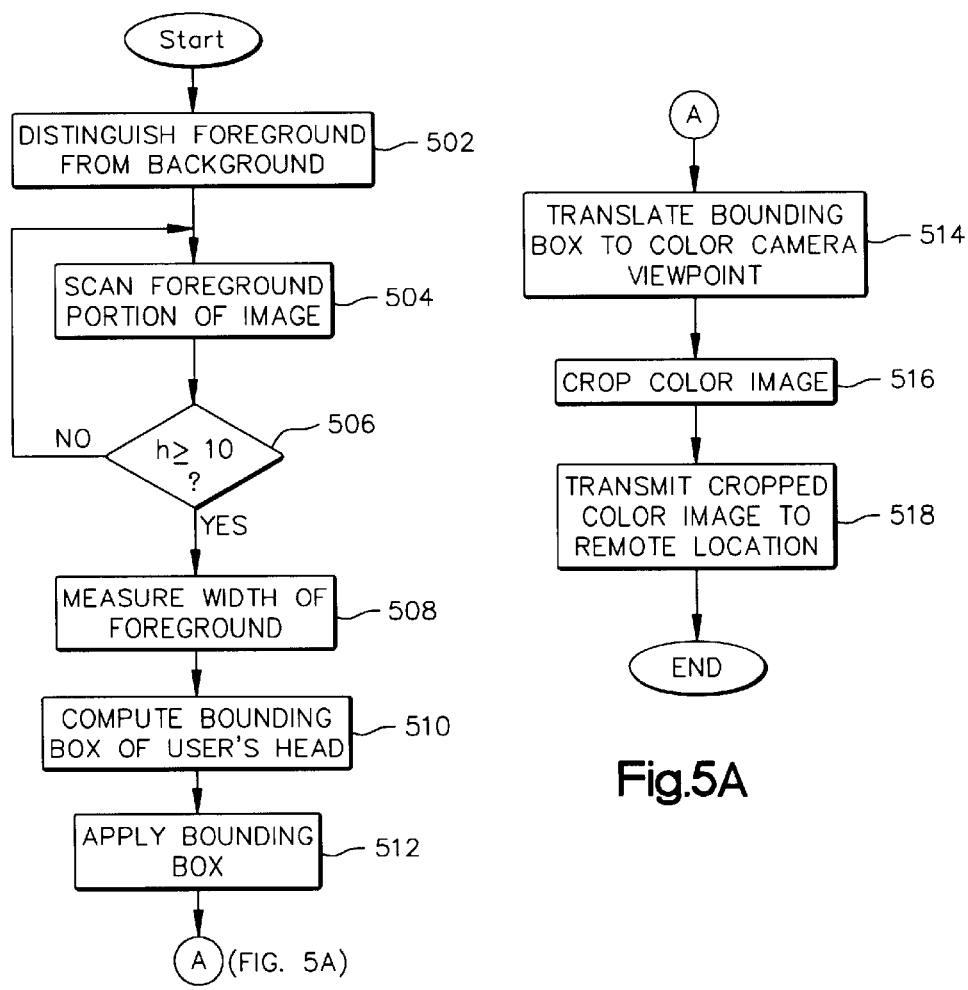
FIGS. 5–5A are flowcharts illustrating the head tracking method of the present invention used in conjunction with the display cube illustrated in FIG. 2.

The processing steps performed to define and track the head 40 of the local user will now be discussed with reference to FIGS. 5–5A. At the outset, it should be understood that the processing steps discussed below could be performed by any suitable processing device, such as computer 30 (FIG. 2). The processing steps can also be performed by a dedicated device, such as an application specific integrated circuit (ASIC) or the like. In an exemplary embodiment of the present invention, the processing devices are computers, each equipped with a video capture card that provides for image processing on a frame-by-frame basis. As discussed above, the rear projection screen 22 is uniformly illuminated with near-infrared light by the near-infrared illuminators 24. The video image of the remote location, if any, is then projected on to the rear projection screen 22 by the rear projector 26. The local user is positioned generally within the center of the display cube 10.

The first step of the tracking process (step 502) begins with detecting luminance differences within the display cube 10. This is done through the use of the near-infrared pass, visible-cut cameras 20. As discussed above, each of the rear projectors 26 emit negligible amounts of light in the near-infrared spectrum. Thus, the color images provided by the rear projectors 26 have no impact on the luminance value of the rear projection screen 22 or what the near-infrared cameras 20 detect. As each of the near-infrared cameras 20 are equipped with visible-cut near-infrared pass filters, they are only capable of detecting light in the near-infrared spectrum. Thus, the changing color images on the rear projection screen 22 are not detected by the near-infrared cameras 20. An object within the display cube 10, for example the head 40 of the local user, having a different luminance value from the rear projection screen 22 is assumed to be in the foreground of the image. The video signals representing the background and foreground portions of the image are transmitted to the corresponding computer 30 for processing. The foreground and background images may also be displayed on a suitable monitor. Video signals displayed on a video monitor sometimes contain artifacts along the outer boundaries of the image. Such artifacts are ignored by the method of the present invention. This is referred to as overscan.

Now that the foreground has been distinguished from the background, the user's head is defined. The foreground image is scanned (step 504) from top to bottom in order to determine the top of the local user's head. The foreground image is scanned in a series of parallel lines (i.e. scan lines) until a predetermined number, h, of adjacent pixels within a scan line, having a luminance value within foreground tolerance are detected (step 506). In an exemplary embodiment, h equals 10. This detected region is assumed to be the top of the local user's head. By requiring a significant number of adjacent pixels to have similar luminance values, the detection of false signals due to video noise or capture glitches are avoided.

At this point, a measurement of the width of the local user's head is performed (step 508). The measurement begins by moving a distance equal to a percentage of the total number of scan lines down from the top of the originally detected (captured) foreground image. The percentage used is a user-definable parameter that controls how far down the image to move when measuring the width of the local user's head. In an exemplary embodiment of the present invention, a value of 10% is used. For example, if 480 scan lines were used to capture the foreground image, the method of the present invention causes the computer 30 to move forty eight scan lines down from the top of the image to measure the width of the image, which is assumed to be the head of the local user. The left edge of the foreground image is acquired by detecting the leftmost foreground pixel value of the scan line. The right edge of the foreground image is acquired by detecting the rightmost foreground pixel value of the scan line. The leftmost pixel value is subtracted from the rightmost pixel value to determine the width of the foreground image, which corresponds to the width of the local user's head at its widest point.

Figure 6:
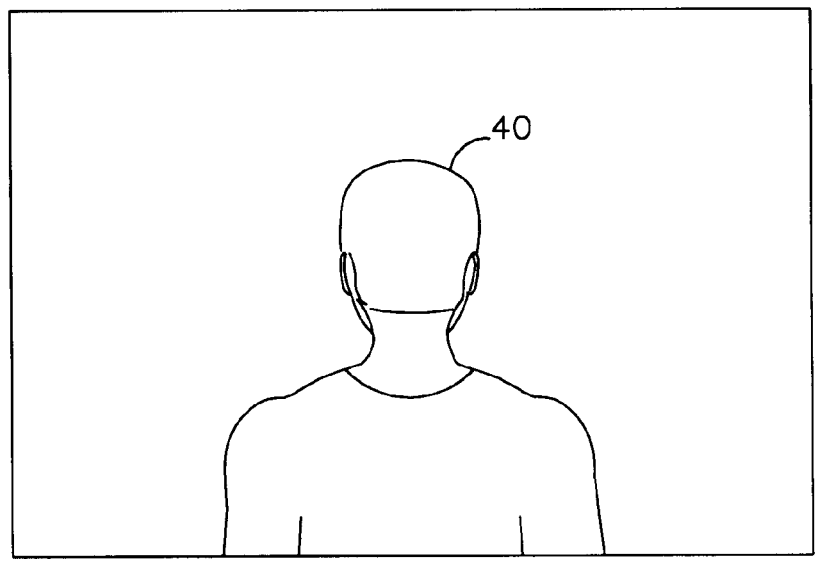
FIG. 6 is a schematic diagram of the user's head illustrated in FIG. 4 after being cropped according to the head tracking method of the present invention.
Figure 7:
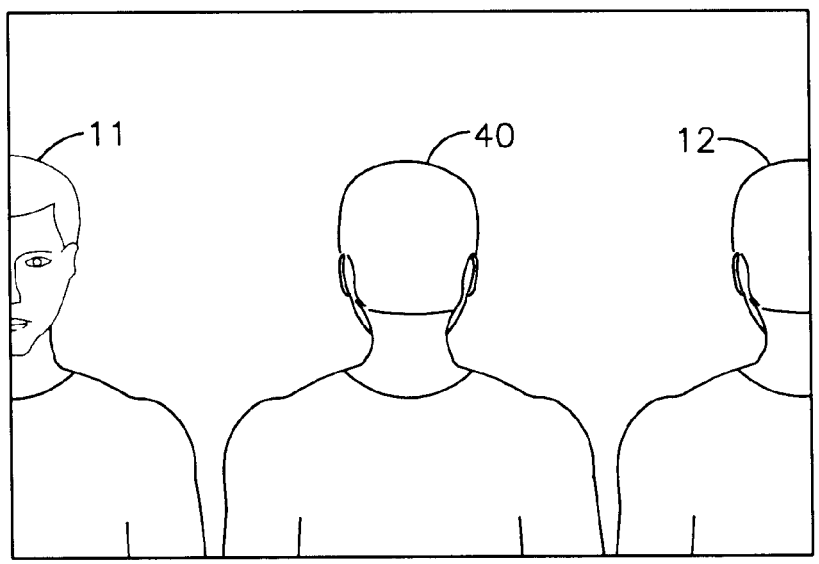
FIG. 7 is a schematic diagram of the resulting image provided by the head tracking method of the present invention.

Based on the calculated width of the foreground image, the position of the top of the foreground image and the aspect ratio of a typical human head, a bounding box of the user's head is computed in step 510. By computing the bounding box based on the aforementioned values, the local user's head can be captured independently of the width of the shoulders of the local user. Upon completion of the detection process described above, the user's head is bounded within a box in step 512. After performing some post-process filtering of the pixels within the bounding box that represent the local user's head, a classic close portrait format showing the local user's face, neck and upper chest is provided on the monitor as illustrated in FIG. 6. The process then continues to step 514 (FIG. 5A).

Tracking head movements of the local user within the display cube can also be accomplished by the present invention. Generally, there are two possible head movements: (1) slow, long-term movements; or (2) higher-frequency movements. An example of a high-frequency movement would be head nodding. According to the present invention, head movements, are tracked by averaging the corners of the bounding box, generated by the process presented in FIG. 5, with previous bounding box corner points using an exponentially weighted average. This is calculated by taking the vertices of a new bounding box, multiplying them by x=1/n, then multiplying the old average by (1−x) and adding the two values. In an exemplary embodiment, n=20 and x=0.05. Since at each new frame the old average is multiplied by (1−x) and added to the old frame value, new data contributes to the averages as $(1-x)^{f}/n$, where f is the number of frames that have passed since the data arrived. The net result is that when there is a large change in head position, the bounding box moves slowly but steadily until it nears the new position and then it settles down more slowly.

Through experimentation, the inventors have discovered that by using a value for n that is slightly larger than the frame rate (e.g. n=20 when the frame rate is 15 fps) works the best. Because the local user's head is not tightly surrounded by the border of the bounding box, there is room for a user to nod their head without falling outside of the calculated bounding box.

After computing the bounding box, the resulting detected image of the viewer can be transmitted to the remote location. As illustrated in FIG. 5A, after the bounding box has been applied in step 512, the portrait of the local user is translated from the view of the near-infrared camera 20 to the view of the color camera 19 in step 514. This is accomplished by using standard graphics techniques. Next the translated bounding box image is used to crop the color image in step 516. In other words, all pixel data located outside of the bounding box is not used in generating the cropped color image. The cropped color image is illustrated in FIG. 6, which shows the local user 40 in the foreground facing the projected persons 11, 12 present at the remote location. At step 518, this cropped color image is transmitted to the remote location via line 36 (FIG. 2). Thus, the remote location is provided with a cropped color version of the head of the local user. In this fashion, the individuals located at the remote location can see and, therefore, directly interact with the local user as if the local user were physically present at the remote location.

Depending on the size and aspect ratio of the display at the remote location, the bounded image of the user can be expanded to fill the display at the remote location. The detecting and tracking method of the present invention can also be expanded to detect, track and transmit hand gestures. This is accomplished by first performing head tracking, then modifying both the horizontal and vertical dimensions of the image. For example, to show hand movements near the local user's head (such as waving to another person), the horizontal dimension must be compressed relative to the vertical dimension.

The above detailed description of the present invention has been presented for the purpose of illustration and description. Although the present invention has been described with respect to a specific embodiment, various changes and modifications may be suggested to persons of ordinary skill in the art, and it is intended that the present invention encompass such changes and modifications as fall within the scope of the claims appended hereto.

What is claimed is:

1. A method of detecting and tracking the head location of a user within an area comprising the steps of:
    (a) uniformly illuminating a rear projection screen that is located in a position behind the user with light having a wavelength in the near-infrared spectrum;
    (b) projecting an image of a location remote from the user onto at least a portion of the rear projection screen, where an image projector emits light having a wavelength outside of the near-infrared spectrum;
    (c) defining the boundary of the head location based on detected near-infrared luminance differences within the area with respect to the rear projection screen.

2. The method of claim 1, further comprising the steps of:
    (d) providing a border around the defined boundary; and
    (e) positioning a border object on a viewing screen relative to the projected image.

3. The method of claim 2, wherein step (d) further comprises the steps of:
    (d1) scanning the pixel representing the bounded image;
    (d2) determining the top portion of the foreground image;
    (d3) moving down a predetermined distance from the top portion of the foreground image of step (d2);
    (d4) determining the leftmost portion of the foreground image, the leftmost portion provided by the pixel located at the left edge of the foreground image of step (d3);
    (d5) determining the rightmost portion of the foreground image, the rightmost portion provided by the pixel located at the right edge of the foreground image of step (d3); and
    (d6) providing a border around the image bounded by the pixel locations determined in steps (d2)–(d5).

4. The method of claim 3, wherein determining the top potion of the foreground image, comprises the step of:
    detecting the presence of n adjacent pixels having a pixel luminance value greater than a threshold level, where n is an integer greater than one.

5. The method of claim 4, wherein n equals 10.

6. The method of claim 2, further comprising the steps of:
    (f) acquiring a color image of the user; and
    (g) transmitting a cropped version of the color image to the location remote from the user, the cropped color image being based in part on the defined boundary of step (d).

7. The method of claim 1, wherein the illuminated area of step (c) comprises a background area and any detected luminance differences are considered foreground information.

8. The method of claim 7, wherein the foreground information represents the head location of the user.

9. A system for detecting and tracking the head location of a user within an area, comprising:
    a rear projection screen located in a position substantially behind the user;
    means for illuminating the rear projection screen with light having a wavelength in the near-infrared spectrum;
    means for projecting a video of a location remote from the user onto the rear projection screen, the projecting means emitting light having a wavelength outside of the near-infrared spectrum; and
    a camera unit located in a position substantially in front of the user, the camera unit including a near-infrared camera and a color camera maintained in a stacked relationship with respect to each other, wherein the near-infrared camera detects head location based on luminance differences between the illuminated rear projection screen and a video object in relative proximity to the projection screen.

10. The system of claim 9, further including means for processing the information detected by the near-infrared camera and the color camera.

11. The system of claim 10, wherein the color camera acquires a color image of the user, and the processing means further includes means for formatting the color image and transmitting the formatted colored image to the remote location.

12. The system of claim 9, wherein the video provided by the projecting means is a visible light video.

13. The system of claim 9, wherein the illumination of the rear projection screen provided by the illuminating means is substantially uniform.

14. The system of claim 13, wherein the illuminating means comprises a group of incandescent lights covered with visible-cut near-infrared pass filters.

15. The system of claim 9, wherein the near-infrared camera is operative to detect the illuminated rear projection screen and any illumination differences relative to the rear projection screen, and the color camera is operative to detect the image projected onto the rear projection screen and the user.

16. The system of claim 15, wherein the near-infrared camera further includes visible-cut near-infrared pass filters.

17. A head detection and tracking system, comprising:
    a rear projection screen located in a position substantially behind a user;

an illuminator operative to uniformly illuminate the rear projection screen with light having a wavelength in the near-infrared spectrum;

a projector operative to project a video image of a location remote from the user onto the rear projection screen, the projector emitting light having a wavelength outside of the near-infrared spectrum; and a camera unit located in a position substantially in front of the user, the camera unit including a near-infrared camera and a color camera maintained in a stacked relationship with respect to each other, wherein the near-infrared camera detects the head location of the user based on luminance differences between the uniformly illuminated rear projection screen and a video object in relative proximity to the rear projection screen.

18. The system of claim 17, further including a processor configured to receive information from the near-infrared camera and the color camera, the processor further configured to generate a cropped color image in response to the information provided by the near-infrared camera and the color camera and transmit the cropped color image to a location remote from the user.

* * * * *